R. W. GUNN AND W. A. S. THOMPSON.
VALVE SEAT.
APPLICATION FILED MAY 17, 1920. RENEWED JUNE 19, 1922.
1,424,094.
Patented July 25, 1922.
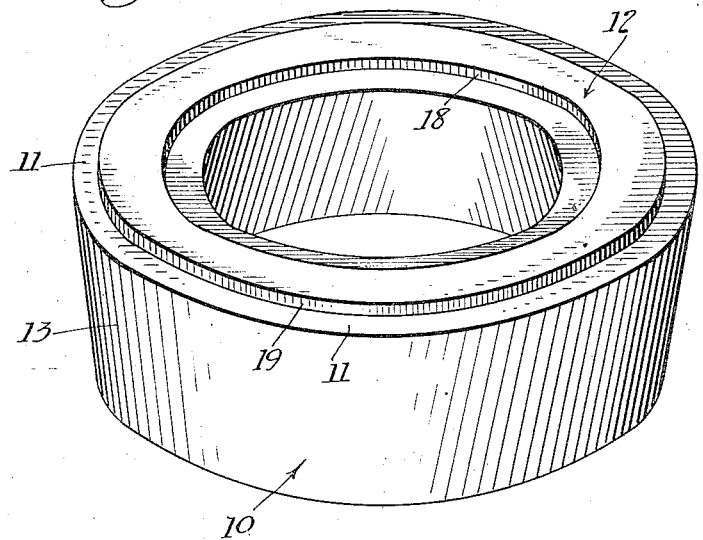
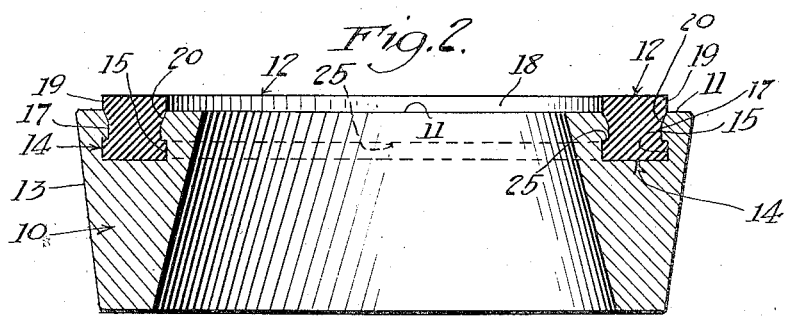
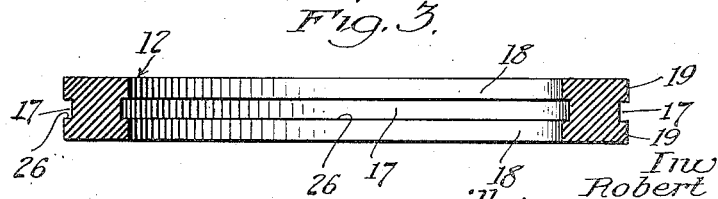
Inventors:
Robert W. Gunn,
Willsie A. Scott Thompson,
by
his Attorney

UNITED STATES PATENT OFFICE.

ROBERT W. GUNN AND WILLSIE A. S. THOMPSON, OF LOS ANGELES, CALIFORNIA.

VALVE SEAT.

1,424,094.     Specification of Letters Patent.     Patented July 25, 1922.

Application filed May 17, 1920, Serial No. 381,808. Renewed June 19, 1922. Serial No. 569,574.

*To all whom it may concern:*

Be it known that we, ROBERT W. GUNN and WILLSIE A. SCOTT THOMPSON, citizens of the United States, residing at Los Angeles, in the county of Los Angeles, State of California, have jointly invented new and useful Improvements in Valve Seats, of which the following is a specification.

This invention relates to a valve member, or seat, for pumps and like machinery and it is an object of the invention to provide a simple, effective, inexpensive, and durable member of this character.

The invention relates more particularly to a seating ring groove in a valve member, either a stationary valve member or a movable valve member, as desired. In this particular application we are setting forth the invention as in the stationary member of a valve but it will be understood that such specific disclosure does not limit its application to only the stationary member of a valve as it may be advantageously applied to the movable member.

A particular object of the invention is to provide a suitable and effective seating ring carrying groove. The ring when installed in the groove provided by this invention is secure and will not be displaced, or carried away, by the flow of liquid through the valve even though the flow is very rapid and under great pressure. This is a particularly important feature of the invention as it makes frequent repairs on the valve seat unnecessary and thereby effects a great saving in time and expense.

A noteworthy feature of the invention is the form of the seating ring groove which makes the ring easy to install but extremely difficult to remove.

Other objects and features of the invention will be best understood from the following detailed description of a preferred form of the invention throughout which reference is ..d to the accompanying drawings in which—

Fig. 1 is a perspective view of a typical valve seat carrying a seating ring as provided by the invention; Fig. 2 is a detailed sectional view through the valve seat and seating ring clearly showing the configuration of the groove in the valve seat which carries the seating ring; and Fig. 3 is a sectional view of the seating ring removed from the valve seat.

Throughout the drawing numeral 10 designates a typical pump valve seat at the upper face 11 of which is carried a seating ring 12. The particular valve seat 10 shown in the drawings is of the type adapted to be forced into a suitable bore or socket formed in the valve deck of the pump cylinder. The outer wall 13 of the valve seat is somewhat tapered so that the valve seat will wedge tightly into the valve deck when it is forced into place.

The seating ring 12, which is carried at the upper face 11 of valve seat 10, is carried in an annular groove 14 formed in the face 11, so as to extend somewhat above the face 11 as clearly shown in Fig. 2 of the drawings. The groove 14 is of such size as to properly receive the seating ring 12 and is of a shape or configuration to firmly and securely hold the seating ring 12. The walls of the groove 14, it will be noted, are not straight but are formed with continuous cavities or grooves 15 at their inner or bottom portions, causing the groove 14 to be somewhat larger at its inner portion than at its outer portion. In fact, the provision of the grooves 15 and the side walls of the groove 14 cause the groove 14 to have a neck or restricted portion at or near its top or outermost portion. The grooves 15 are preferably such as to form downwardly facing shoulders 25 as shown in the drawings.

In practice the groove 14 may be formed to have the necessary neck or restricted portion at or near its outermost portion by merely providing a cavity, or groove, 15 in one of the side walls of groove 14. Further, it will be understood that the groove or grooves 15, as the case may be, may be varied considerably in size and shape without materially altering the configuration of the groove 14. Therefore, the invention is not limited or restricted to the particular size, proportion, or shape of groove 15, shown in the drawings.

The seating ring 12, rather than being a straight sided ring, such as is commonly employed in devices of this character, is formed with suitable cavities or grooves 17 in its inner and outer side walls 18 and 19. These grooves 17 are continuous grooves and are provided in the seating ring 12 so that it will more or less conform with the configuration of groove 14 when it is in place in the valve seat 10. It is not necessary, and in fact not altogether desirable, that the seating ring 12 be made to exactly conform with the groove 14 as it is merely necessary that it be formed so that it will fill the groove 14, particularly the bottom or large portion of the groove 14, and thereby effectively anchor or secure itself in place. In practice it is desirable to form the seating ring 12 slightly larger than the groove 14 so that it is more or less under compression when in place in the groove 14. It is preferred that the grooves 17, in the ring 12, be shaped to form upwardly facing shoulders 26 to engage the shoulders 25 in groove 17 thereby causing the ring to be securely anchored and held against displacement. It will be understood, of course, that the seating ring 12 need only have one groove 17 when it is to be installed in a groove 14 having only one side wall grooved or recessed and, in fact, it need only have one groove 17 when it is to be installed in a groove having both side walls grooved.

It will be noted in Fig. 2 of the drawings that there are cut-away or beveled portions 20 at the extreme top or upper portions of the side walls of groove 14. These beveled portions 20 cause the extreme top portion of groove 14 to be somewhat wider than the neck or restricted portion thereby greatly simplifying or facilitating the installation of seating ring 12. This construction also causes the entire ring to act as a cushion as it causes the ring to compress into the groove, when the valve seats, rather than allowing only the outer portions to be subjected to compression and therefore spread over face 11, as is common in ordinary valves of this general character. Further, with this form of groove the ring will not be cut by the outer edges of the groove.

It will be readily understood that when the seating ring 12 is arranged in groove 14 that it is practically anchored or immovably secured in valve seat 10 and will therefore not be displaced or carried away by the most violent or forceful flow of fluid through the valve. Further, it will be understood that the seating ring 12, being arranged to extend somewhat above the upper face 11 of valve 10, will effectively receive and seat a disk or other valve member that may be arranged to co-operate with the valve seat.

The seating ring 12 is preferably formed or molded of rubber of the proper degree of hardness to suit the particular circumstances under which it is to be used. It will be understood however that the invention is not in any way limited or restricted to the seating ring 12 being made of any particular material or of any particular degree of hardness as it may be advantageously made of any particular material or any composition of material having or possessing the general characteristics of rubber, or the like.

Having herein set forth only a preferred embodiment of our invention we do not wish to restrict ourselves to the particular details hereinabove set forth but wish to reserve to ourselves any changes or modifications that may appear to those skilled in the art or that may fall within the scope of the following claims.

Having described a preferred form of our invention, we claim:

1. A valve member with a seating ring groove having a side wall grooved at its inner portion and beveled at its outer portion.

2. A valve member with a seating ring groove larger at its inner portion than at its outer portion and having its side walls beveled at their extreme outer portions.

3. A valve member with a seating ring groove having a middle portion of uniform width, an inner portion wider than the middle portion, and an outer portion diverging outwardly from the middle portion.

In witness that we claim the foregoing we have hereunto subscribed our names this 11th day of May, 1920.

ROBERT W. GUNN.
WILLSIE A. S. THOMPSON.

Witness:
E. D. CAVENDER.